(12) United States Patent
de Ville

(10) Patent No.: US 7,558,803 B1
(45) Date of Patent: Jul. 7, 2009

(54) COMPUTER-IMPLEMENTED SYSTEMS AND METHODS FOR BOTTOM-UP INDUCTION OF DECISION TREES

(75) Inventor: Barry de Ville, Holly Springs, NC (US)

(73) Assignee: SAS Institute Inc., Cary, NC (US)

( * ) Notice: Subject to any disclaimer, the term of this patent is extended or adjusted under 35 U.S.C. 154(b) by 337 days.

(21) Appl. No.: 11/701,186

(22) Filed: Feb. 1, 2007

(51) Int. Cl.
G06F 7/00 (2006.01)
G06F 17/00 (2006.01)

(52) U.S. Cl. .................................. 707/101; 707/4
(58) Field of Classification Search ............. 707/101, 707/102, 6; 704/4
See application file for complete search history.

(56) References Cited

U.S. PATENT DOCUMENTS

| | | | | |
|---|---|---|---|---|
| 5,787,274 | A * | 7/1998 | Agrawal et al. | 707/102 |
| 6,567,814 | B1 * | 5/2003 | Bankier et al. | 707/101 |
| 7,197,504 | B1 * | 3/2007 | Runkler et al. | 707/102 |
| 2003/0208488 | A1 * | 11/2003 | Perrizo | 707/6 |
| 2004/0111253 | A1 * | 6/2004 | Luo et al. | 704/4 |

OTHER PUBLICATIONS

"Induction of Decision trees", J.R. Quinlan, centre of Advanced computing Sciences, New south Wales Institute of Technology, Sydney 2007, Australia.*

Apte, Chid et al., "Text Mining with Decision Rules and Decision Trees", Conference on Automated Learning and Discovery, Carnegie-Mellon University, Jun. 1998, pp. 1-4.

Weiss, Shololom M. et al., "Maximizing Text-Mining Performance", IEEE Intelligent System, Jul./Aug. 1999, pp. 2-8.

* cited by examiner

*Primary Examiner*—Hung T Vy
(74) *Attorney, Agent, or Firm*—Jones Day

(57) ABSTRACT

Computer-implemented systems and methods for constructing decision trees to predict target values. A method can include receiving data containing descriptive data and target values. The target values are partitioned into groups. A rule induction engine generates a set of rules for each group based upon a set of descriptive data. The rules are configured to predict target values. In a bottom-up manner, a decision tree is generated for each of the groups.

20 Claims, 13 Drawing Sheets

COMPUTER-IMPLEMENTED SYSTEMS AND METHODS FOR BOTTOM-UP INDUCTION OF DECISION TREES

TECHNICAL FIELD

This document relates generally to computer-assisted predictive modeling and more particularly to computer-implemented systems and methods for bottom-up induction of decision trees.

BACKGROUND

Decision trees are used to categorize values in a data set through a series of limited-option steps. The steps can be binary, wherein each step is limited to two possible choices, thus producing a binary decision tree. As an alternative, each step may permit, or require, a greater number of options. Each data value eventually is represented by one of the bottommost nodes in the tree, called leaf nodes. The greater the number of options at each step, the lesser will be the number of steps from the top of the tree, called the root node, to the leaf nodes. For example, a binary decision tree for a data set containing 32 data values would have no fewer than five steps from the root node to the leaf nodes. However, a decision tree for the same data set that permitted four options at each step potentially could have only three steps from the root node to the leaf nodes.

Traditionally, such decision trees are constructed beginning at the root node. From there, the process of constructing the tree works down, setting up limited-option steps until each data value is properly represented by a single leaf node. The intermediate nodes in a decision tree, those between the root node and the leaf nodes, are referred to as middle nodes.

SUMMARY

In accordance with the teachings provided herein, systems and methods for operation upon data processing devices are provided to construct decision trees to predict target values. For example, a method and system can be configured such that data is received containing descriptive data (e.g., qualitative and/or quantitative descriptive data) and target values. The target values are partitioned into groups, wherein each group contains a distinct subset of the target values. A rule induction engine generates a set of rules for each group based upon a set of descriptive data. The rules specify a relationship between a set of descriptive data and the target values in a group, and the rules are configured to predict target values. In a bottom-up manner, a decision tree is generated for each of the groups. The generation in a bottom-up manner includes using the rule set of a group to generate lower level nodes of the decision tree for the group before generating the upper level nodes of the decision tree for the group. The generated decision trees for each of the groups are used to output predicted target values for input data.

As another example, a method and system can be configured such that data is received containing descriptive data and target values. The target values are partitioned into groups, wherein each group contains a distinct subset of the target values. A rule induction engine generates a set of rules for each group based upon a set of descriptive data. The rules specify a relationship between a set of descriptive data and the target values in a group, and the rules are configured to predict target values. In a bottom-up manner, a decision tree is generated for each of the groups. The generation in a bottom-up manner includes using the rule set of a group to generate leaf nodes of the decision tree for the group before generating the middle nodes and root node of the decision tree for the group. The generated decision trees for each of the groups are used to output predicted target values for input data.

DETAILED DESCRIPTION

Figure 1:
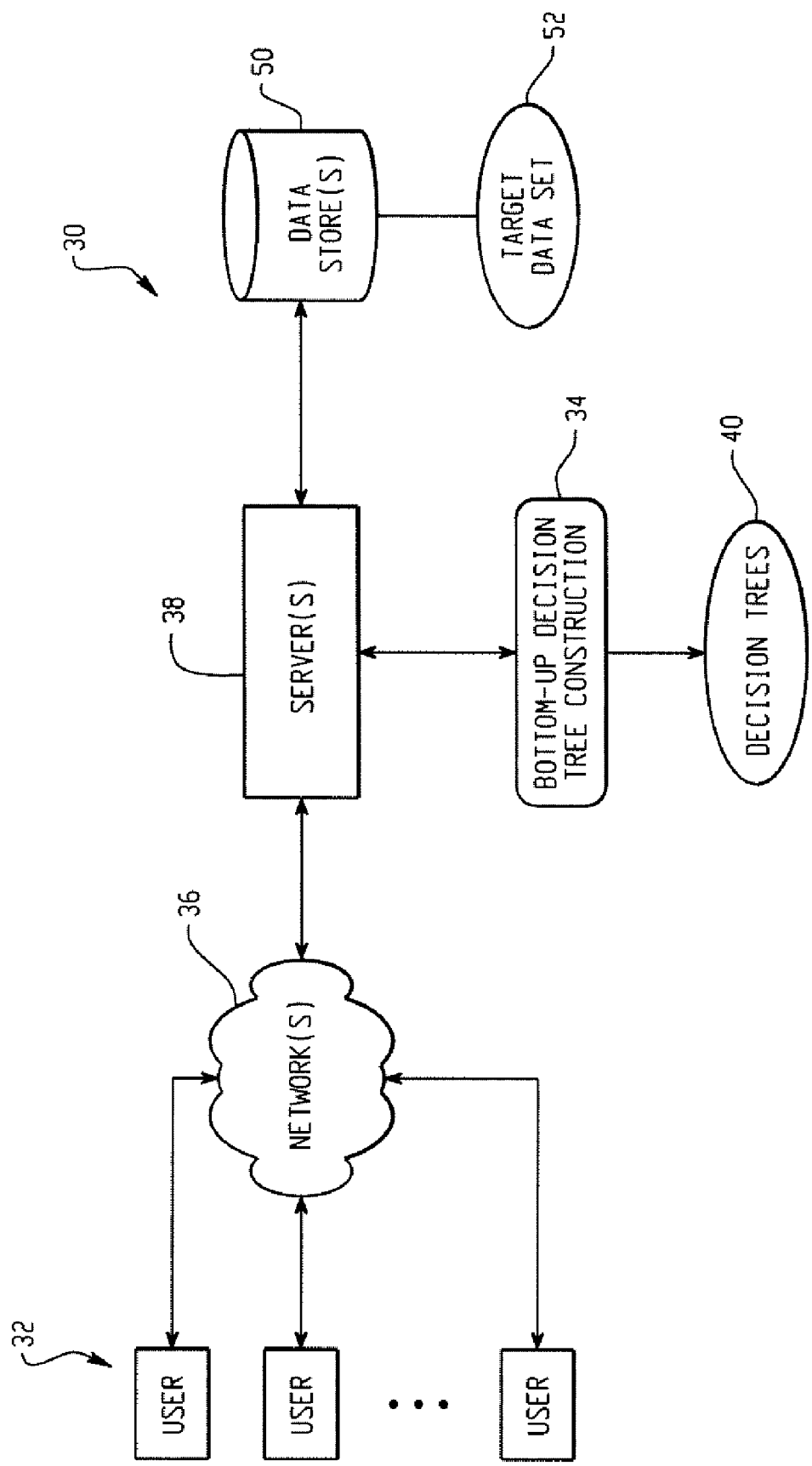
FIG. 1 is a block diagram depicting an environment wherein users can interact with a software decision tree construction system.

FIG. 1 depicts at 30 an environment wherein users 32 can interact with a software decision tree construction system 34 to generate decision trees 40 using a bottom-up approach based upon an input target data set 52. In this system, the lower level nodes of the decision tree are first defined. More specifically, a tree is built using a rule induction process so that the most likely rule that could have produced the bottom node is identified in a node-by-node fashion until the entire decision tree structure is determined.

The users 32 can interact with the decision tree construction system 34 through a number of ways, such as over one or more networks 36. A server 38 accessible through the network(s) 36 can host the decision tree construction system 34. One or more data stores 50 can store the data to be analyzed by the system 34, such as the target data set 52.

The decision tree construction system 34 can be an integrated web-based tool that provides users functionality for constructing decision trees to address a diverse body of problems, such as building decision trees to perform warranty-related problem identification. For example in the automotive field, automotive warranties can consist of 1900 or more discrete warranty code outcomes. One automotive warranty code may indicate a particular engine repair while another code indicates that a windshield wiper blade was replaced. These two repair operations are very different and therefore the codes associated with these operations should be predicted with a degree of accuracy by the constructed decision trees 40.

Figure 2:
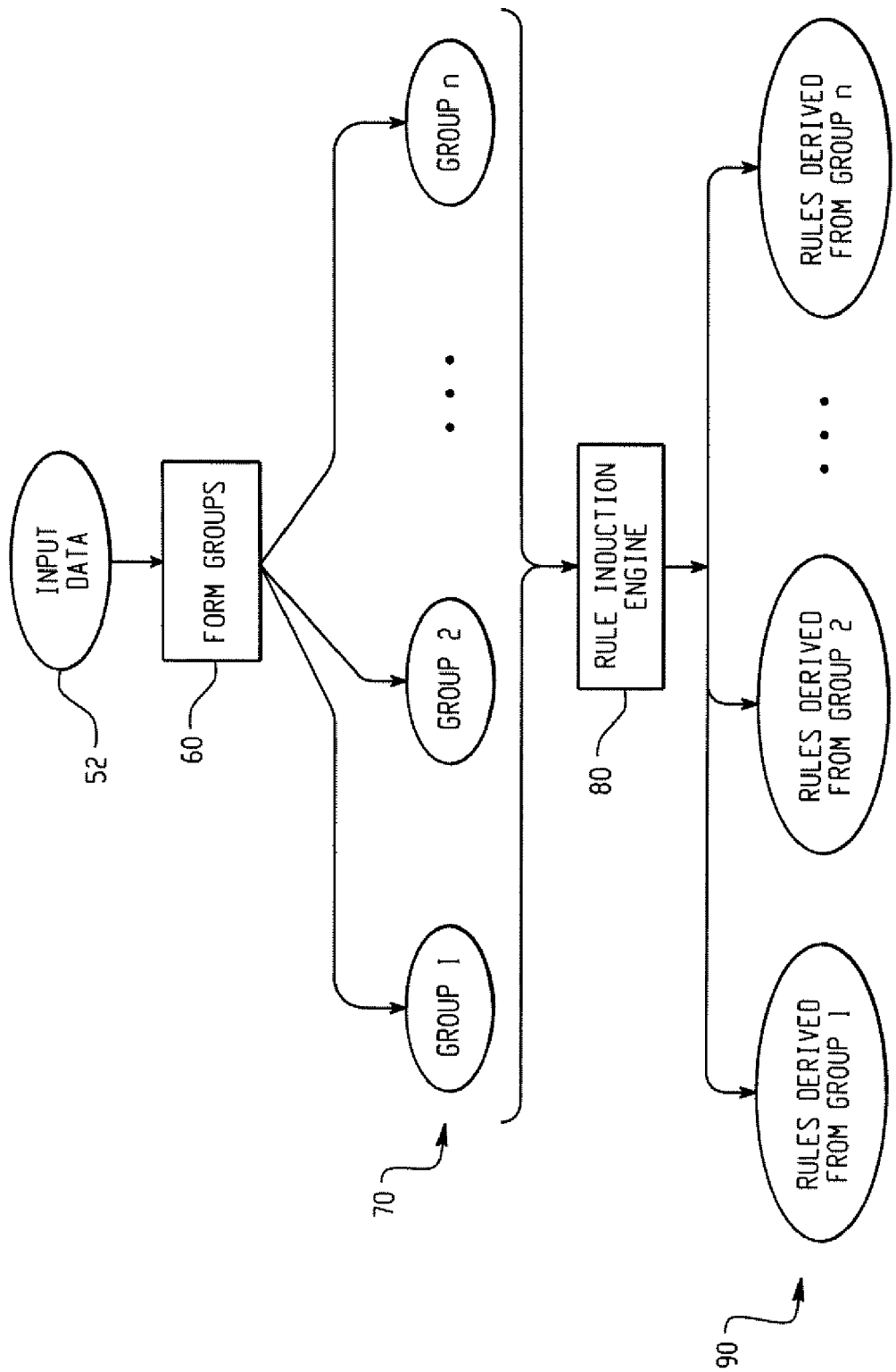
FIGS. 2 and 3 are process flow diagrams depicting the processing of an input target data set to construct decision trees.
Figure 3:
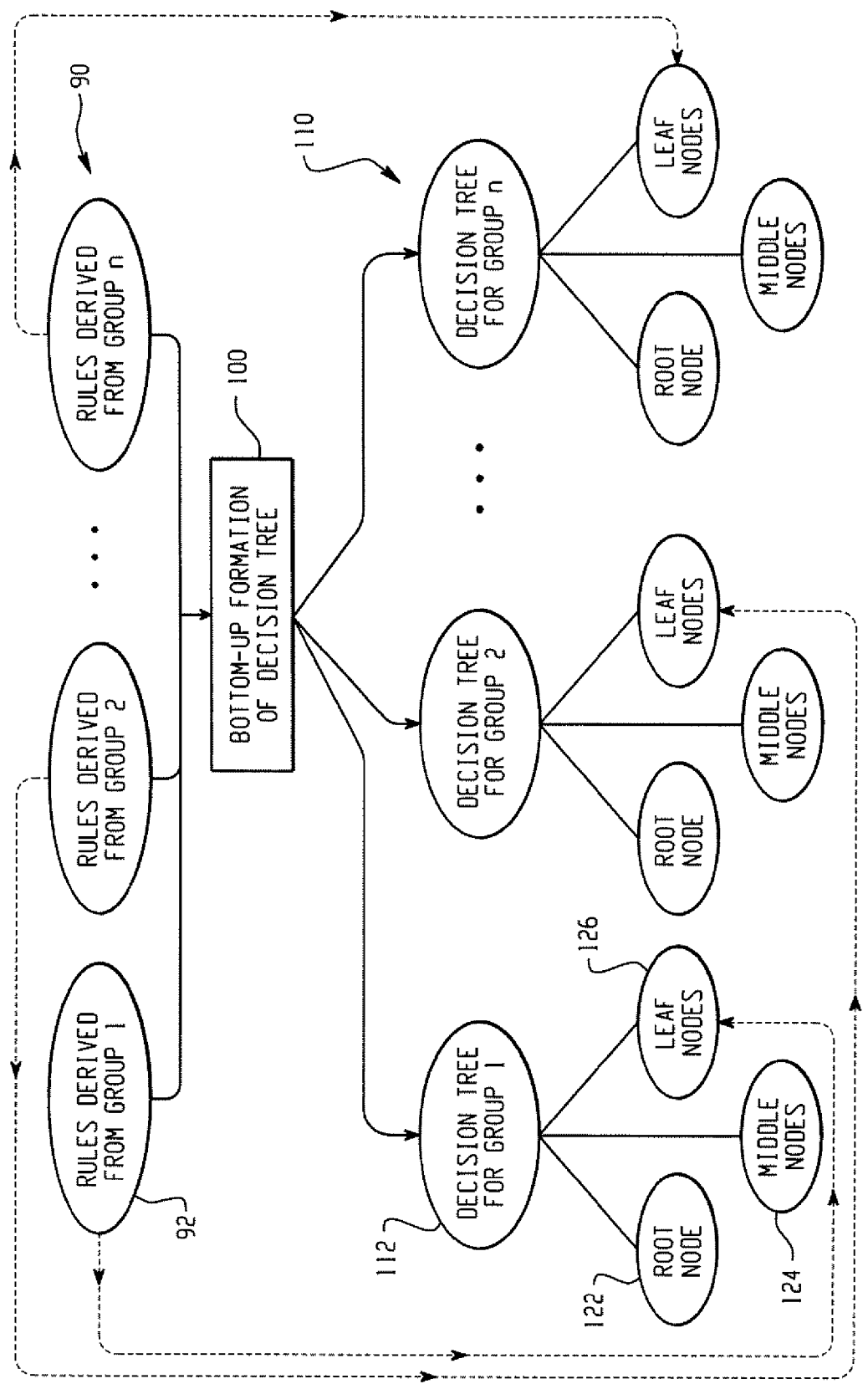

FIGS. 2 and 3 are process flow diagrams depicting the processing of an input target data set 52 to construct decision trees 110. Process 60 forms groups 70 based upon the input data 52. Process 60 can be configured such that each group has a maximum number of members. A maximum number of members defines how many groups 70 process 60 is to form. As an illustration, if there are 1000 unique identifiers or codes in the input data set 52 and the maximum number of members is pre-specified at 100, then process 60 forms 10 groups.

A rule induction engine 80 processes the information that is within each group in order to generate rules for each of the groups 70 as shown at reference numeral 90. The rule induction engine 80 uses a rule induction pruning process or program (RIP) to derive the non-hierarchical rules for each group. A number of modeling approaches may be used by the rule induction engine to derive non-hierarchical rules. For example, a rule induction program that is available in Enterprise Miner from SAS Institute Inc. (located in Cary, N.C.) can be used for the rule induction engine 80. In this program, rule induction nodes are used to process input data for generating rules about the input data.

Rules 90 are non-hierarchical rules that are derived for each group of data and which describe the data within their respective groups. Because the non-hierarchical rules 90 lack structure, process 100 is used to construct decision trees 110 from the non-hierarchical rules 90. Process 100 constructs the decision trees 110 using a bottom-up approach, wherein the bottom nodes are constrained a priori because the targets are already known (with the specific rules having to be determined for the targets in order to predict the targets). Process 100 uses the non-hierarchical rules to form the leaf nodes of a decision tree. For example, process 100 uses non-hierarchical rules 92 derived from group 1 as the bottom nodes or leaf nodes 126 for group 1's decision tree 112 and so decision tree rules are constructed to determine the node attributes versus all other nodes at the bottom level of the tree 112. Once the leaf nodes 126 are identified, they are combined to form the middle nodes 124 and root node 122 of the decision tree 112 for group 1. Decision trees for the other groups are constructed in a similar fashion.

The root node 122 contains all instances of the target values in the full set of data being analyzed. It should be understood that an initial iteration of a rule induction pruning process can identify a middle node 124. A middle node does not contain a "pure" case, wherein a pure case contains only one target value (which is a leaf node). Pure cases, or substantially pure cases are removed from the training data, one value at a time. The remaining data is processed again until all leaf nodes (pure cases) are identified.

A purity threshold property of a rule induction node (available in Enterprise Miner) specifies the minimum training leaf purity percentage required for a leaf to be ripped. Observations in leaves which meet or exceed the threshold are removed from the training data. The default setting for a purity threshold property is 100, but acceptable values are integers, such as 80 or 90. An initial rule induction process comes up with one or more rules that drive the codes into pure nodes. For example, if the process results in a rule that predicts 90% of the code 10s that are in the training data set and the purity threshold is set at 80, then this rule is used as a leaf node for code 10. The data set is then reduced by taking out the data related to code 10. On a successive iteration in this example, a rule might be determined that classifies 85% of the code 50s. Because this is above the threshold, the rule is used as a leaf node for code 50. Processing continues to determine rules for the remaining codes that drive them into pure nodes. It may occur that rules cannot be found that satisfy the purity threshold for one or more codes; in such a situation, the process ends with rules that only can predict such codes at a lower level of probability.

After construction through the bottom-up approach, the decision tree 112 is applied in the traditional way to additional data sets, with the steps occurring from top-to-bottom in order to characterize data values.

Figure 4:
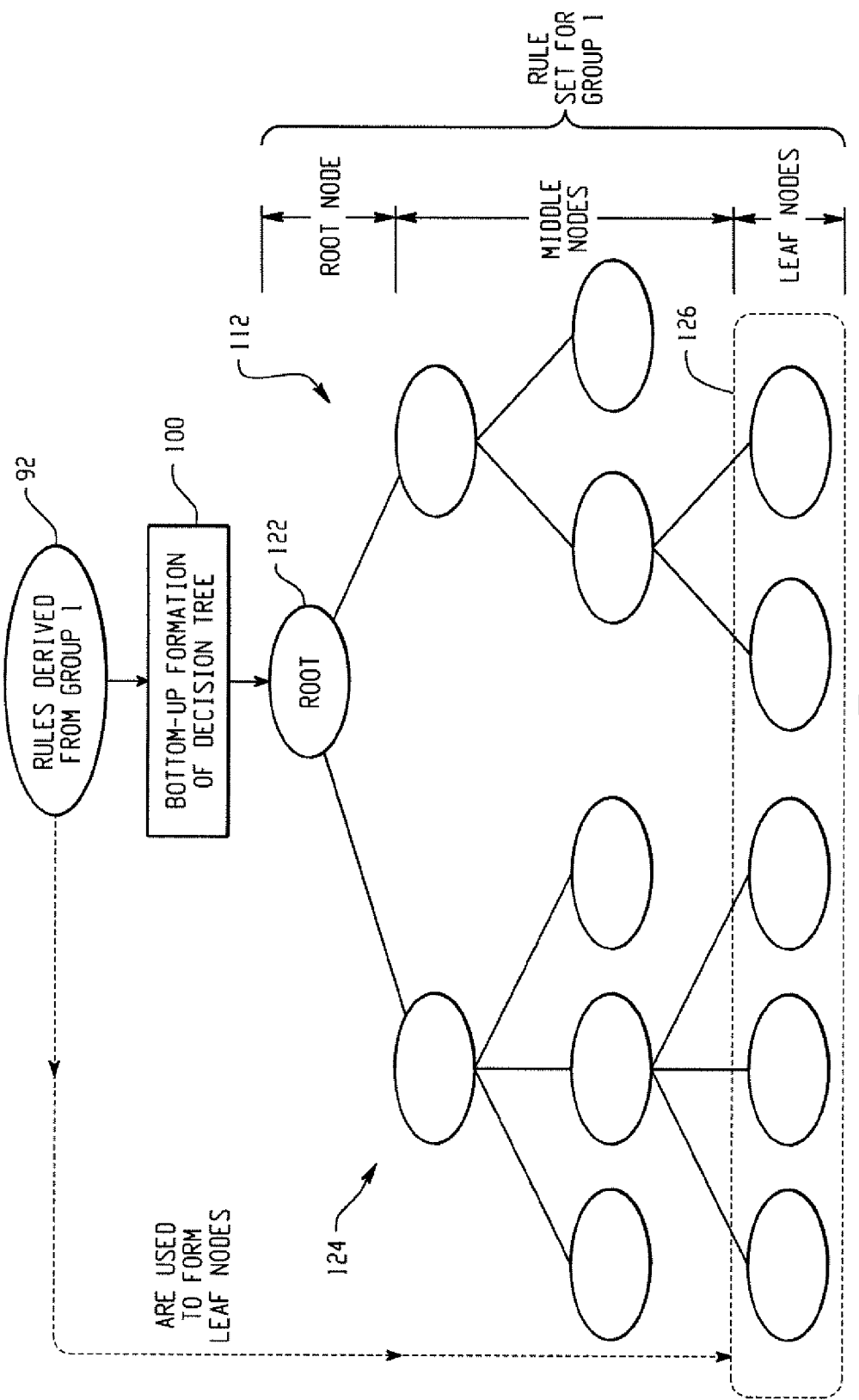
FIG. 4 is a graphical depiction of a decision tree constructed for a group of data.

FIG. 4 shows a graphical depiction of the decision tree 112 for group 1 that was constructed in FIG. 3. As discussed with reference to FIG. 3, the non-hierarchical rules 92 derived from group 1 are used to form the leaf nodes 126 of the decision tree 112. The result of the bottom-up formation process 100 is a decision tree 112, having a root node 122, one or more middle nodes 124, and a leaf node for each member of group 1 126. The decision tree 112 alternatively may be referred to as the rule set for group 1.

Figure 5:
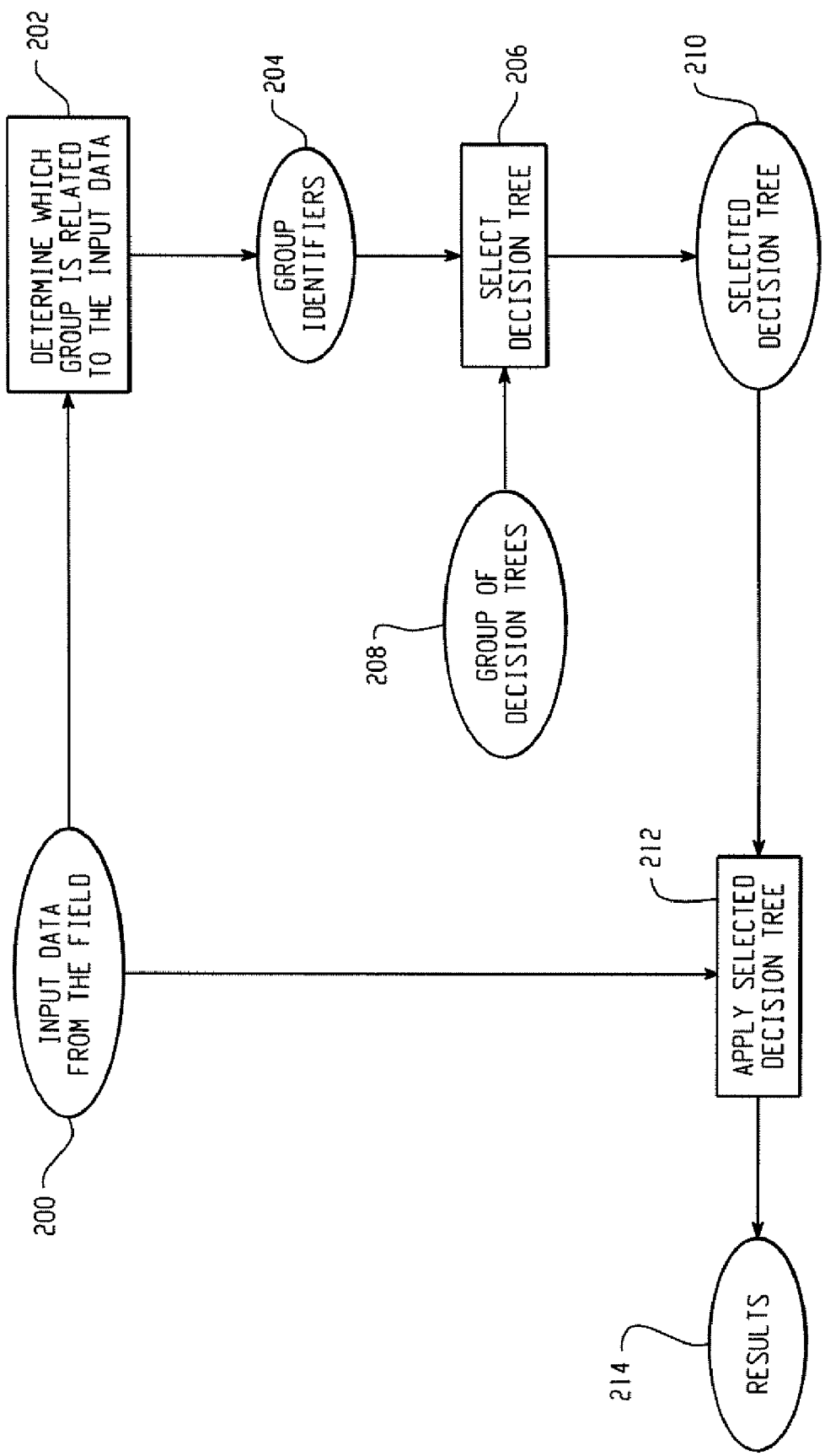
FIG. 5 is a process flow diagram depicting use of decision trees that have been constructed through a bottom-up process.

FIG. 5 shows use of decision trees 208 that have been constructed through a bottom-up process. In this example, the input is data from the field and for which one or more predictions or decisions have to be made. Such input data could represent, as an illustration, warranty data related to repairs of consumer goods and for which predictions have to be made about the true nature of repairs that were performed upon the consumer goods. Each of the decision trees 208 can correspond to a particular group of repairs, wherein a group can contain an arbitrary collection of repair codes (e.g., a grouping irrespective of the type of repair that is done on a consumer good).

Process 202 examines the records contained in the input data 200 to determine which records belong in which groups. Based upon the examination, process 202 assigns group identifiers to the record. Based on the group identifiers 204, process 206 selects the appropriate decision tree for the data from the group of decision trees 208 that has been constructed to predict target values for the given input data. Once the appropriate decision tree is selected, that decision tree is applied at process 212 to the input data 200. The application of the selected decision tree to the input data 200 produces results 214, such as in this example, a set of predicted warranty repair codes related to the repair of consumer goods.

Figure 6:
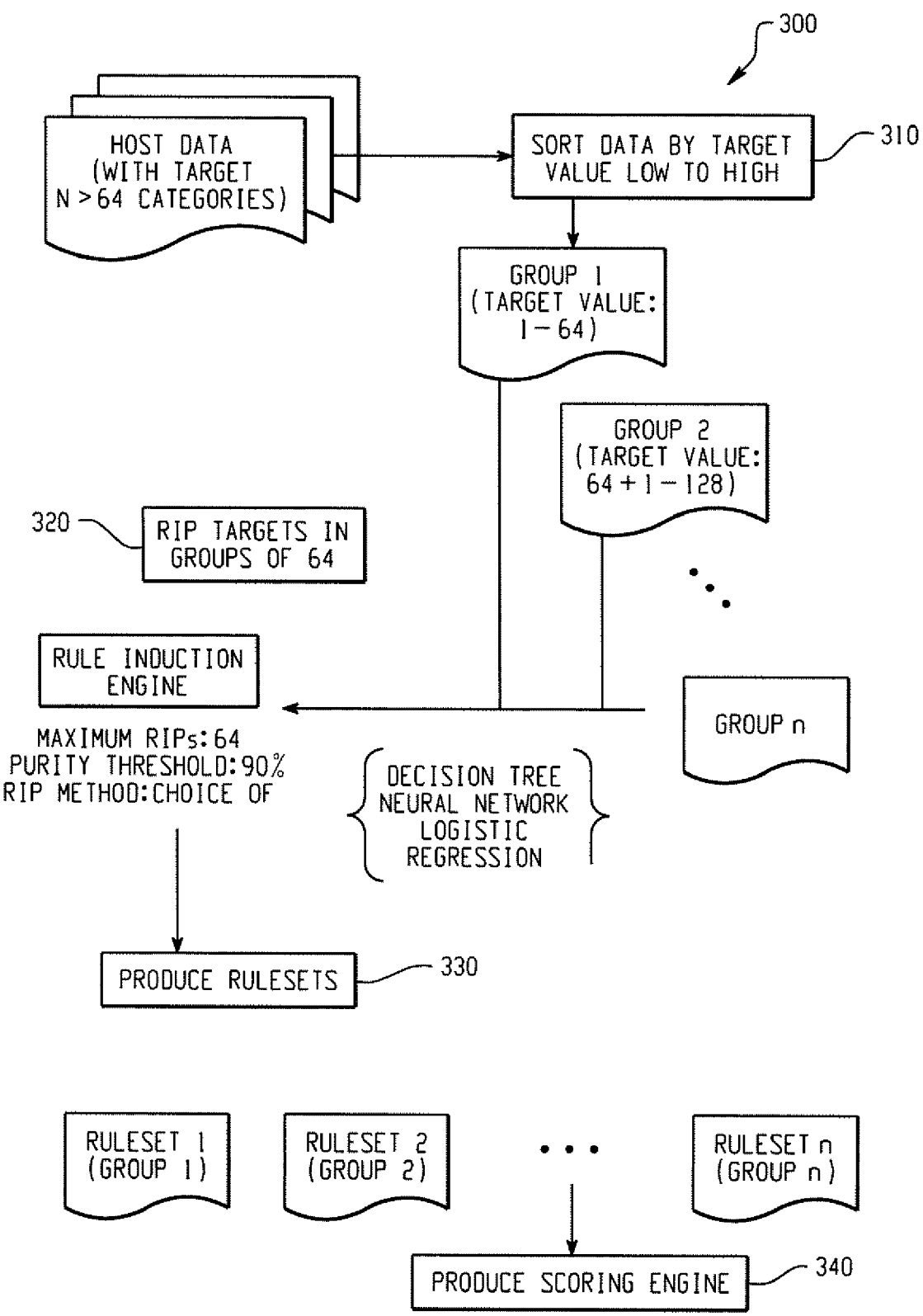
FIG. 6 is a process flow diagram depicting how decision trees can be constructed in a bottom-up fashion to predict warranty codes for automotive repairs.

As an illustration of another application, FIG. 6 is a process flow depicting at 300 how decision trees can be constructed in a bottom-up fashion to predict warranty codes for automotive repairs. As mentioned above, automotive warranties can consist of 1900 or more discrete warranty code outcomes. The process of FIG. 6 forms a decision mechanism for predicting warranty codes based upon input data.

In this example, the maximum number of members (e.g., warranty codes) in a group is established based upon a pre-defined constraint, such as a limitation in the number of members that can be processed by a particular software program (e.g., the rule induction engine). The rule induction engine which generates the non-hierarchical rules has, in this example, a processing limitation of 64 members for any particular group. Accordingly, the number 64 (or a number less than 64) is established as the maximum number of members that a group can have before it is processed by a rule induction engine. If there are around 1900 warranty codes, then there will be an integer number of (1900/64) groups formed (e.g., 30 groups). However it should be understood that other criteria can be used to determine how large a group should be. For example, an industry standard can establish categories of codes, with the category having the largest number of codes being used to set an upper limit for the number of unique members that can be contained within a group.

To form these groups, process 310 sorts the input data (which has a number of target values in the set of input data greater than 64) by the target value. The target value could include, for example, the numerical warranty codes for repairs to a motor vehicle. In one embodiment, the groups are created through the sequential numerical sorting of the warranty codes, and the first 64 warranty codes are placed in group 1, the second 64 warranty codes are placed in group 2, and so on, until all of the warranty codes have been assigned to a group.

Having formed a number of groups from the input target values, each group then is subjected to a rule induction pruning (RIP) process 320 via a rule induction engine. A variety of modeling approaches may be used in the rule induction engine to model the non-hierarchical rules that correspond to the values in the input data set. Such modeling approaches could include a decision tree model approach, a neural network model approach, a logistic regression model approach, etc.

The output of the rule induction engine for each group includes non-hierarchical rules corresponding to the values in the input data set. As an illustration, if the first group contains a windshield wiper repair code, then one or more discrete rules are generated by the rule induction engine to predict whether certain other input data (e.g., narrative repair text) is indicative of a windshield wiper repair operation. This type of prediction can be useful as a check to ensure that repair operations are being reported by a dealer for reimbursement in an accurate and consistent manner.

Once non-hierarchical rules are formed for a group of input data, the non-hierarchical rules become the input into process 330 for generating the rule sets of the decision tree for a particular group. An example of two-non-hierarchical rules being merged to form a higher level decision tree node is sort order within geography or dates and geography (e.g., if failed part=1, 2, or 10 and plant of origin="Ohio", then it is a higher level node). In general, criteria or guidelines for merging lower nodes into upper nodes can include size of training data (e.g., minimum numbers necessary, otherwise, merge), similarity of target predictions (e.g., if two targets tend to have similar patterns then merge them), etc.

After decision trees (e.g., a hierarchical rule sets) have been constructed for each group, the constructed decision trees then become the input to process 340 which generates a scoring engine. Generation of the scoring engine includes translating the rules into propositional logic.

For example, a rule within the decision tree is converted into a IF-THEN format, such as If (condition 1 and condition 2 or . . . ) Then code 10 (with a probability of 85%). The tree paths correspond to the propositional logic contained in the rules of the scoring engine.

The scoring engine is configured to receive input data (e.g., narrative warranty text received from the field) and scores/predicts the warranty codes based upon the received input data. As illustrated in this example, the bottom-up induction approach can be useful in many different situations, such as assisting in identifying what underlying factors, features or functions can be said to be determining a seemingly arbitrary grouping of observations, or records, in a data set.

Figure 7:
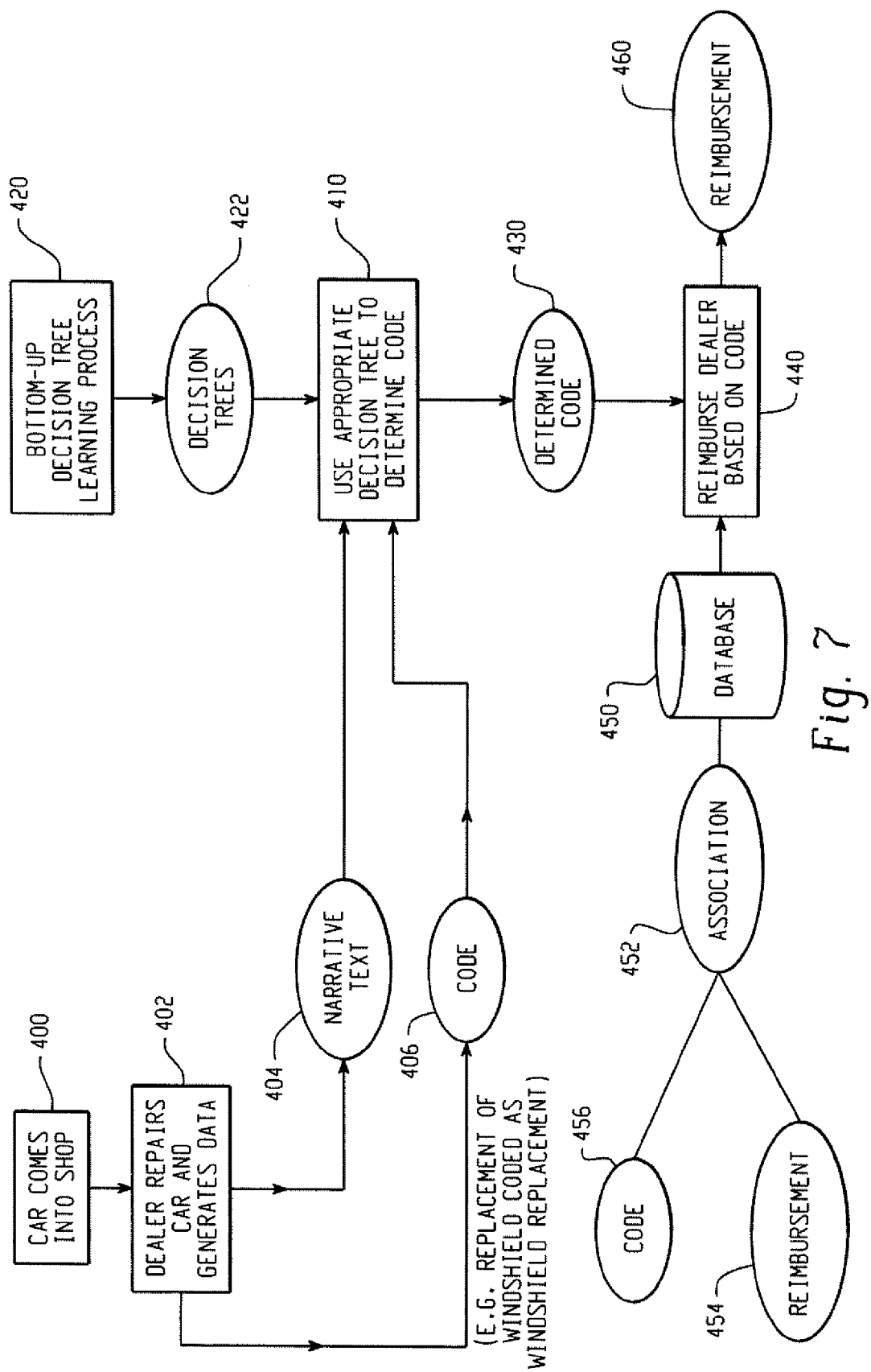
FIG. 7 is a process flow diagram depicting application of a scoring engine developed via the processing of FIG. 6 to predict warranty codes for motor vehicles.

FIG. 7 shows application of the scoring engine developed via the processing of FIG. 6 to predict warranty codes for motor vehicles. Input data is generated in the field when, for example, a car is brought into a dealer's shop by its owner for a repair as indicated at 400. As indicated at 402, the dealer repairs the car and generates data (404 and 406), consisting for example of a narrative from the mechanic regarding the work that was done on the car and a warranty code entered by the mechanic or dealer that will form the basis for the dealer's reimbursement by the manufacturer. Normally, the narrative text also will be shared with the car's owner. Accordingly, it may be the case that the narrative description of the repairs is a better indicator of what class of repairs was made to the car than is the warranty code entered by the dealer.

At some other point in time, the manufacturer (or the agent responsible for warranty reimbursement) has undertaken to construct a scoring engine having decision trees 422 that were generated through a bottom-up formation process 420, such as through the processing of FIG. 6. A decision tree thus formed is used at process 410 to predict a warranty code 410 that is appropriate for a particular repair based on the narrative description provided along with the claim for reimbursement.

The manufacturer may maintain a database 450 that has an association 452 between a particular level of reimbursement 454 for the dealer with a particular warranty code 456. This reimbursement-association information can be used to determine at process 440 the proper level of reimbursement 460 the manufacturer should pay to the entity that performed the repair work on the car. For example, rather than reimbursing the dealer based on the warranty code entered by the dealer, the manufacturer can use the decision tree constructed earlier to automatically predict the warranty code that should have been entered based on the narrative description and reimburse the dealer based upon the predicted results. Because the manufacturer may be confronted with potentially thousands of warranty claims to process, the automatic prediction capability is a benefit to the manufacturer for screening the field data.

As an illustration, a dealer may have mistakenly used an engine repair code when actually a windshield wiper blade repair operation had been performed. Based upon the narrative repair text which would typically include terms such as "windshield wiper blade," process 410 can determine that the more accurate code should be that of a windshield wiper blade repair code. Process 440 can reimburse the dealer for the less-expensive windshield wiper repair operation instead of the engine repair operation. It should be understood that the predicted results can be used in many different ways, such as to allow the dealer to review and explain any discrepancies between the predicted warranty code results and the actually submitted warranty codes prior to any reimbursement being provided. Moreover, other entities can use the decision trees such as a dealer in order to automatically provide a warranty code or at least to provide a check for the warranty code that they have manually assigned to the repair operation.

Figure 8:
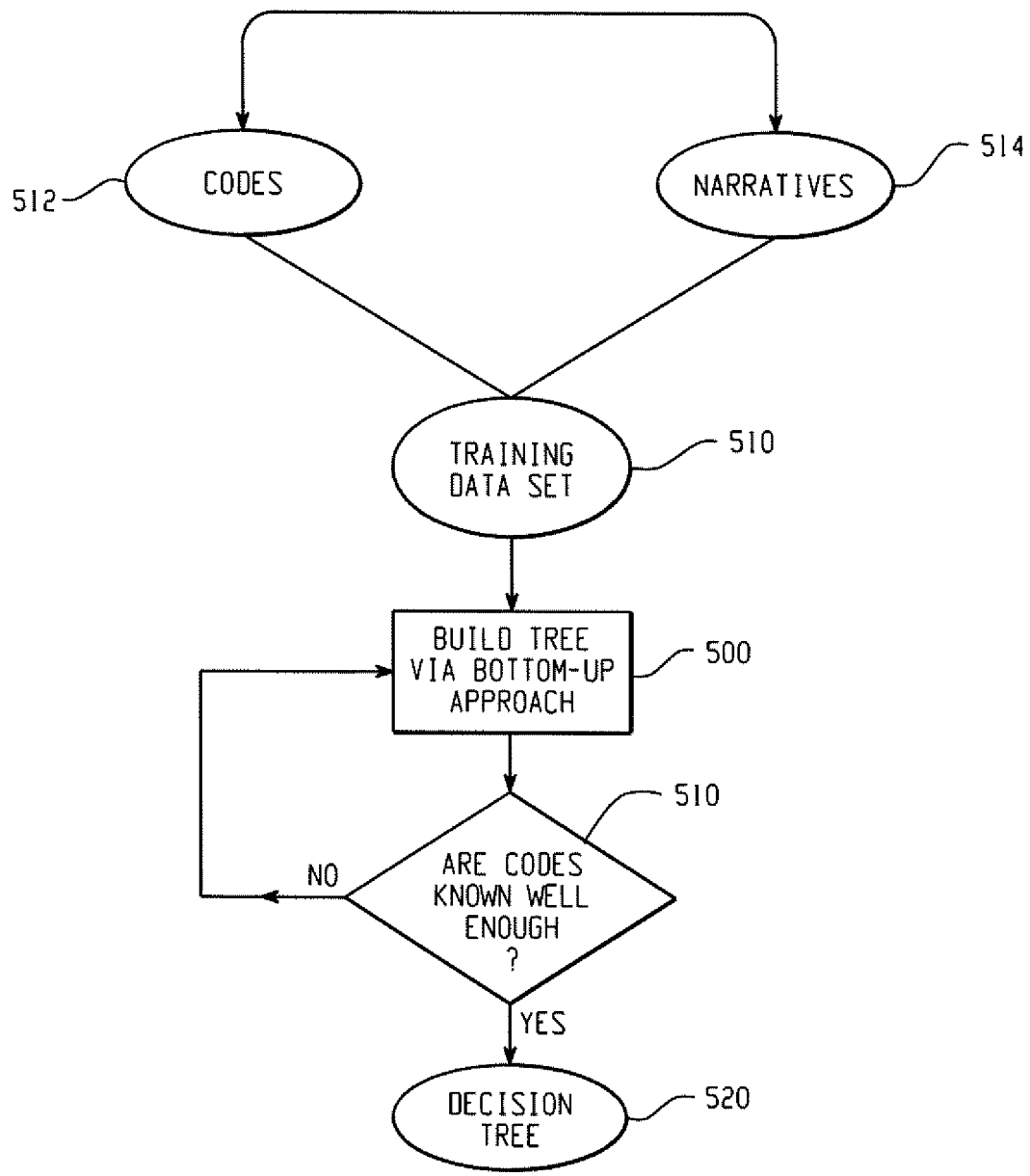
FIG. 8 is a process flow diagram depicting how decision trees can be trained to predict warranty codes.

FIG. 8 depicts a process flow by which decision trees can be trained to predict warranty codes. The training process flow accepts as input 510 a group of codes 512 and their respective narratives 514. As an example, code 00861 could be associated with the narrative text "replacement of vehicle's constant velocity joint." From the input group 510 of codes and related narratives, process 500 constructs a decision tree via a bottom-up approach that predicts the code based upon an input narrative text.

If the codes are known well enough by the decision tree under training as determined at decision process 510, then the decision tree is considered ready for inclusion in the scoring engine. Decision process 510 can make this determination based upon one or more criteria, such as whether there is acceptable error rate in the prediction of the codes.

However if the codes are not known well enough as determined at decision process 510, then process 500 removes the training data that is associated with well-known codes and continues training the codes that are deemed not to be well-known. This process continues until the codes are known well enough in order for the decision tree to be built (e.g., a pre-specified training threshold has been satisfied).

It should be understood that similar to the other processing flows described herein, the steps and the order of the steps in this processing flow herein may be altered, modified, removed and/or augmented and still achieve the desired outcome. For example a multiprocessing or multitasking environment could allow two or more steps to be executed concurrently, such as allowing for concurrent training of multiple groups of codes.

Figure 9:
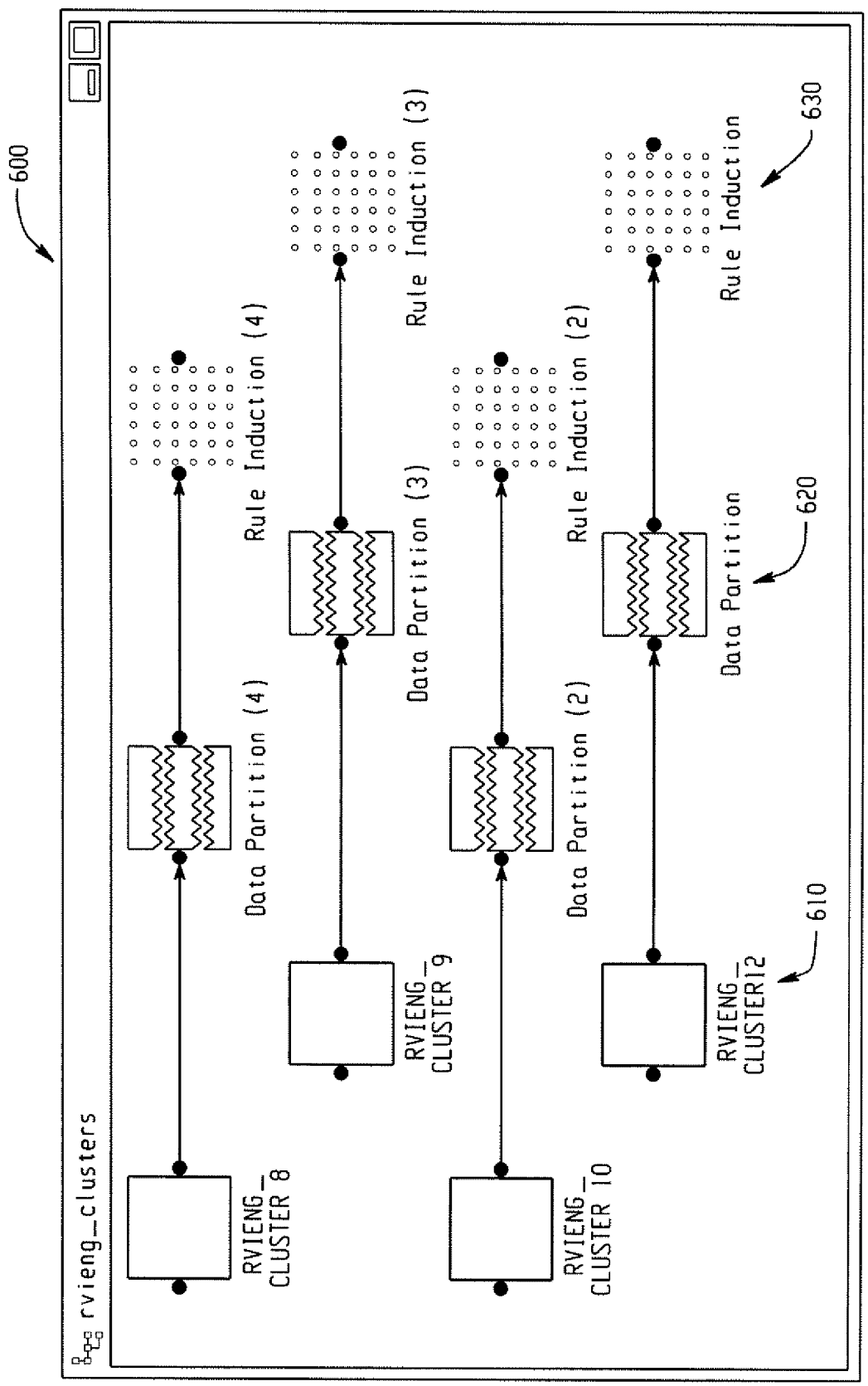
FIG. 9 is a graphical depiction of using rule induction nodes as part of a process to construct decision trees.

FIG. 9 depicts at 600 use of rule induction nodes 630 within the Enterprise Miner software program as part of the process to construct decision trees through bottom-up induction. The program flow generates via nodes 610 clusters of data that may fall within multiple groups.

The data is partitioned via nodes 620 so that each code and its associated narrative can reside within its pre-assigned group. As indicated by rule induction nodes 630, the rule induction engine then processes each data partition in order to generate non-hierarchical rules related to the input data contained in each data partition. Each group of non-hierarchical rules then is used as the input for the bottom-up induction of a decision tree. The individual data points in the clusters form the bottom or leaf nodes of the newly-generated decision tree. In this way, a decision tree is constructed for each of the clusters generated by the software.

Figure 10:
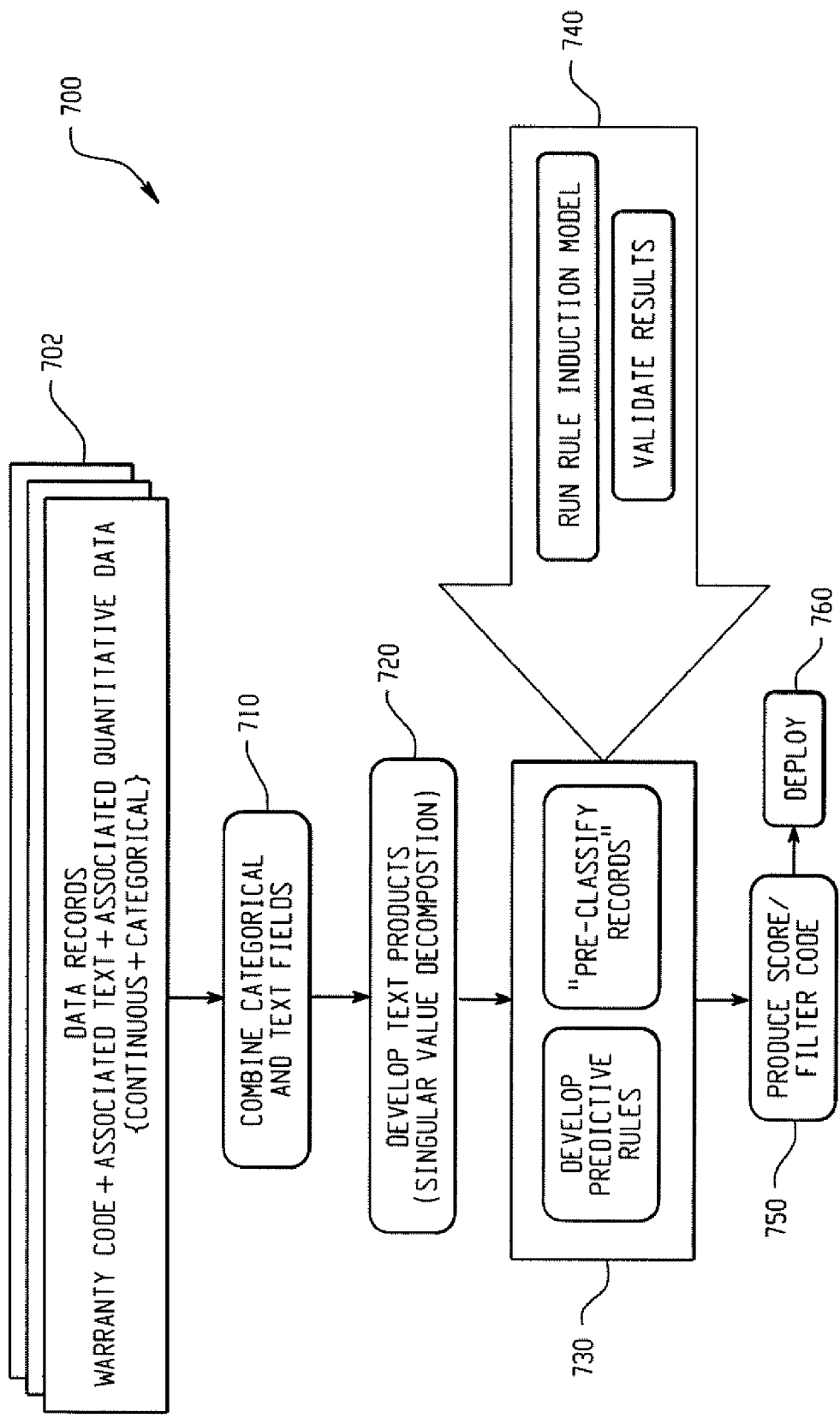
FIG. 10 is a process flow diagram depicting an application by which decision trees can be used in the field of vehicle warranty repair.

FIG. 10 illustrates at 700 another application by which decision trees can be used in the field of vehicle warranty repair. The input to the process consists of input data records 702, collected in the field. This data contains warranty codes and related narrative data, as well as associated quantitative data, both continuous and categorical.

Because there may be many nuances involved in a warranty action, multiple sources of information can be tied together at process 710 in order to make a warranty outcome code decision. Text mining can work more efficiently (when taken in combination with other categorical fields and continuous fields, such as, for example, miles and total credit) than simple table mappings and code conversion lookups. An example of the greater efficiency of combining information could be that the total number of miles may help indicate whether it is more likely that an engine repair is needed versus a wiper blade repair operation.

Process 720 creates the text mining terms. In this step, paragraphs of text are decomposed into various term-document combinations that are summarized using a type of factor analysis called singular value decomposition. The result of this analysis is a set of singular value decomposition (SVD) scores, which capture the meaning and predictive information of the text. In general, there may be as many scores as unique terms in the document collection. However, in practice, many fewer SVD scores can be used.

After creation of the singular value decomposition scores is complete, a warranty record pre-classification scheme is developed. As mentioned above, there are over 1900 unique code values in the motor vehicle warranty repair area. In the current field of data mining predictive tasks, these are often called 1-of-N codes because it is usually necessary to construct a series of dummy variable outcomes where a code is marked one if present and zero otherwise; an outcome with 1900 unique code values would necessitate 1900 outcomes, each with a binary value to indicate the presence or absence of the code.

In the approach described herein, the standard 1-of-N approach can be avoided by, among other things, process 730 assigning warranty codes to various clusters and developing predictive rules that can be used to predict to which cluster or group an incoming warranty code belonged in the scoring (or predictive classification) stage of the development.

Process 740 then learns the cluster classification rules. In the motor vehicle warranty repair example, each of the pre-classified groups of warranty records are processed through a rule-learning process using the Enterprise Miner rule induction procedure. This procedure learns the unique combination of text, categorical and continuous field values that can be used to accurately and reliably predict or classify the specific warranty code that records in a particular group tend to possess. The output of this step is non-hierarchical rules that relate to the warranty outcome codes that are part of the input data.

The use of validation samples in the learning step, along with the fact that the input data includes known warranty codes, ensures that reliable, reproducible, and accurate classification/prediction rules are developed by this process. As an example of validation samples, clusters can be split into training and validation data sets at a particular ratio (e.g., 70% to 30% ratio). The rules that can best predict the likelihood of any record belonging in one cluster compared to another are then extracted using a rule induction method.

Once each set of rules that can be used to determine the likely cluster membership are derived then a scoring facility or engine is constructed at process 750. Process 750 uses the newly-formed rules to classify or predict the warranty codes on new, unseen warranty records that were not used in the learning step. While still in the development phase, the new, unseen warranty records may include known warranty codes. The inclusion of such codes allows for further assessment of the performance of the cluster classification rules developed in the learning step. Also the generated scoring engine may be used to score unclassified records that do not contain a pre-existing warranty code.

Process 760 is a deployment step which consists of developing facilities to: apply singular value decomposition fields to incoming records, apply predictive rules to pre-classify the record into groups or clusters, and process groups by applying predictive rules to apply a predicted warranty class. The final product consists of a scored record with an assigned warranty outcome code.

Figure 11:
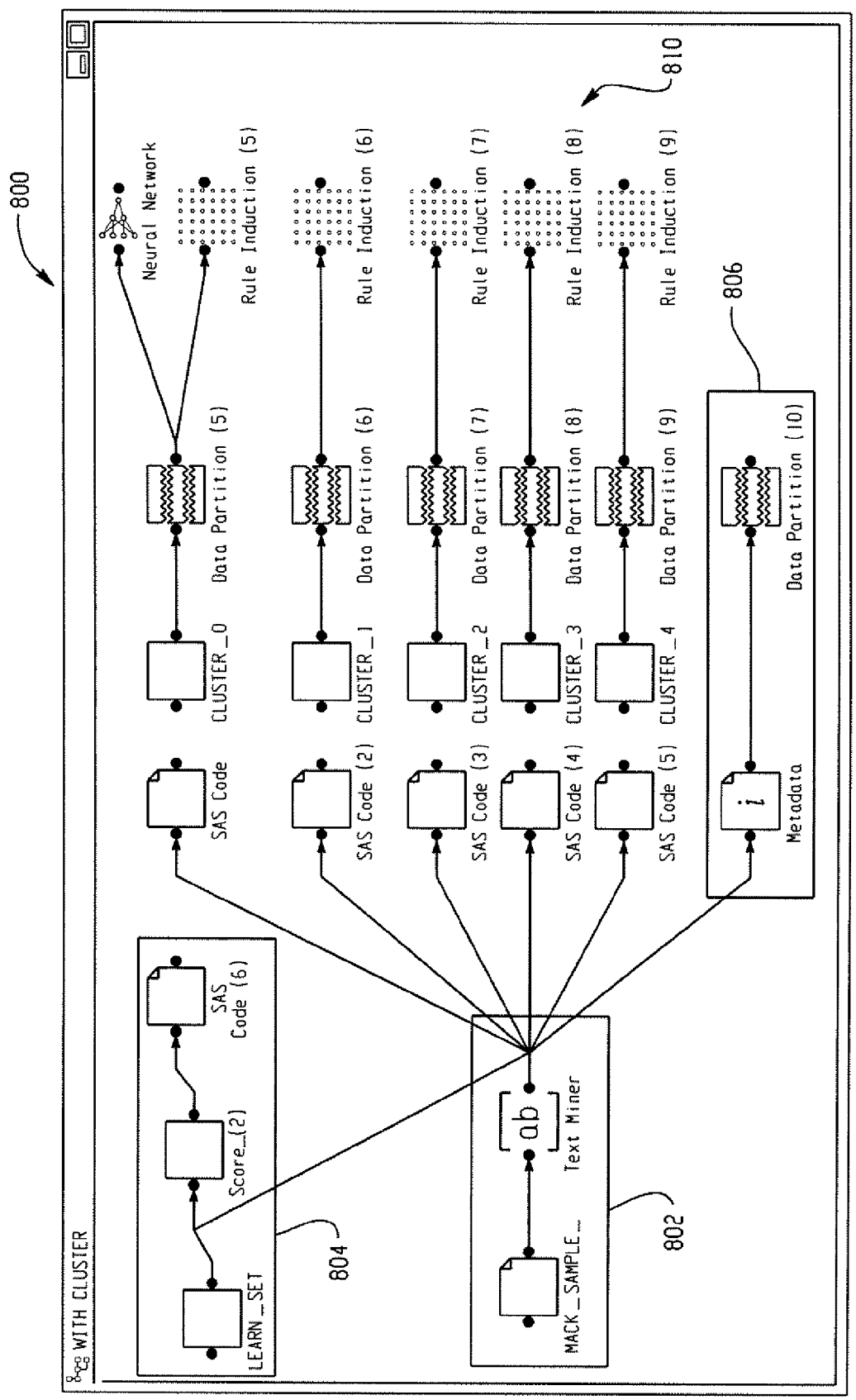
FIG. 11 is a graphical depiction of an example implementation of the process described in FIG. 10.

FIG. 11 depicts at 800 an example implementation of the process described in FIG. 10 through the learning phase. More specifically, FIG. 11 depicts graphically the steps that lead to the generation of non-hierarchical rules for each subset of the input data. The highlighted area 802 containing the entities captioned "MACK_SAMPLE_" and "Text Miner" shows the text mining part of the process. The highlighted area 804 containing the entities captioned "LEARN_SET," "Score (2)," and "SAS Code (6)" shows the scoring for the singular value decomposition part of the process. The third highlighted area 806, containing the entities captioned "Metadata" and "Data Partition (10)" show the use of a metadata node to partition the input data into training and test data so as to reliably and accurately form classification rules for the groups (shown as CLUSTER_0, CLUSTER_1 and so on). The remainder of the diagram shows at 810 the operation of the rule induction nodes to learn the warranty classification rules for each of the five groups that were identified in the example.

Figure 12:
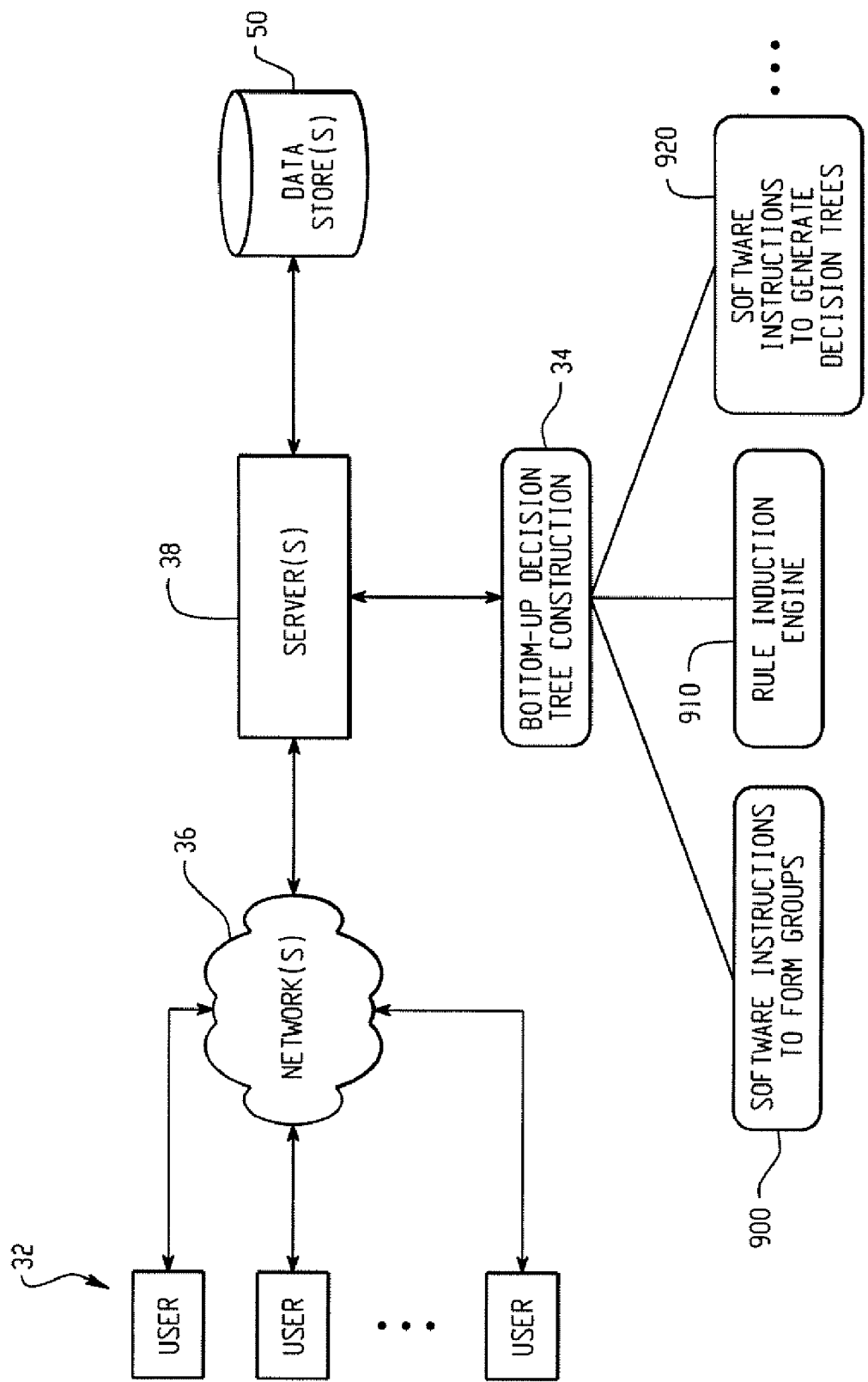
FIG. 12 is a block diagram depicting a software system composed of several software modules.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the bottom-up tree construction system 34 can be configured in many different ways, such as in the manner depicted in FIG. 12. As shown in FIG. 12, the software system can be composed of several software modules. First, the software system can contain a module 900 (e.g., software instructions) to form groups from a set of input data, a rule induction engine module 910 to perform rule pruning, as well as software instructions 920 to construct decision trees from non-hierarchical rules related to a group of input data.

Figure 13:
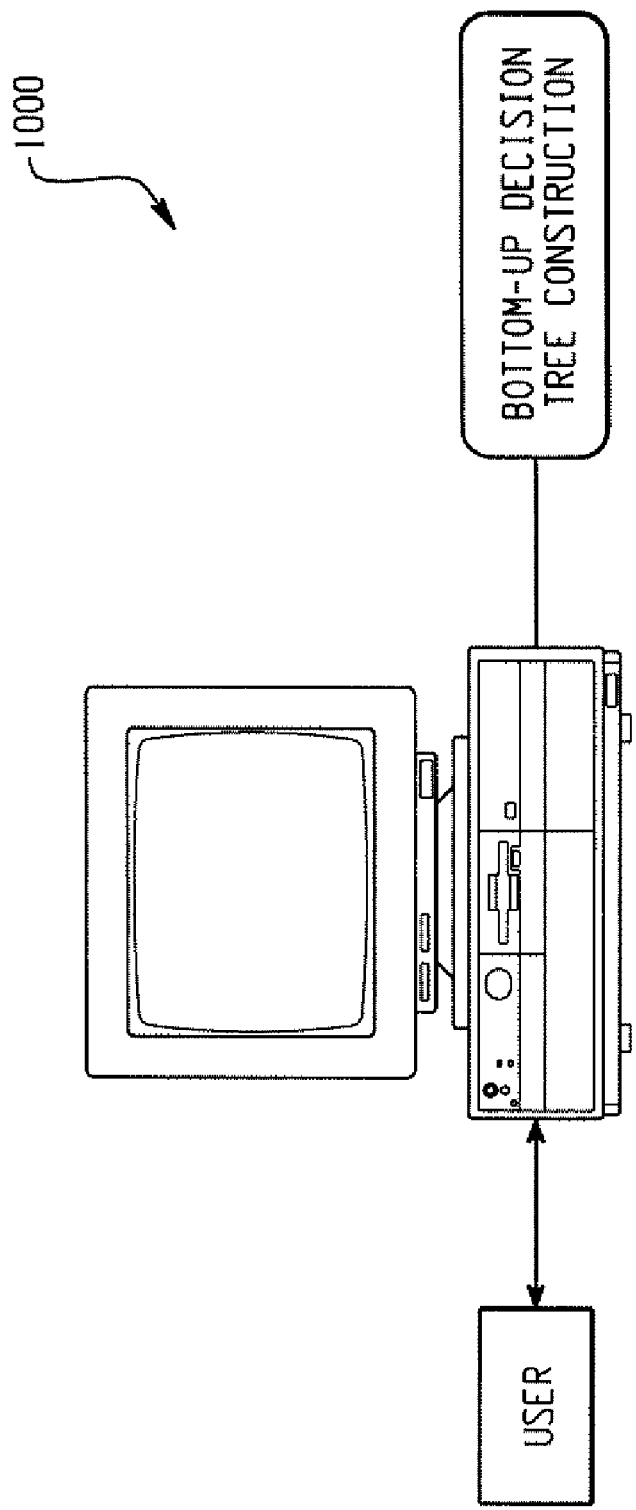
FIG. 13 is a block diagram depicting a stand-alone environment wherein users can interact with a software decision tree construction system.

It is further noted that the systems and methods may be implemented on various types of computer architectures, such as for example on a single general purpose computer (as shown at 1000 in FIG. 13) or on workstation, or a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method for constructing decision trees to predict target values, comprising:
executing instructions on a processor for receiving data containing descriptive data and target values;
executing instructions on the processor for partitioning the target values into groups;
wherein each group contains a subset of the target values;
executing instructions on the processor for applying a rule induction engine to generate rules for each group based upon a subset of the descriptive data that is used for each group;
wherein the rule induction engine generates decision trees by using a modeling approach that includes a decision tree model approach, a neural network model approach, or a logistic regression model approach;
wherein the rules specify a relationship between the descriptive data and the target values in a group;
wherein the rules are configured to predict target values;
executing instructions on the processor for generating, in a bottom-up manner, a decision tree for each of the groups;
wherein the generation in a bottom-up manner includes using the rule set of a group to generate leaf nodes of the decision tree for the group before generating the middle nodes and root node of the decision tree for the group;
whereby the generated decision trees for each of the groups are used to output predicted target values for input data.

2. The method of claim 1, wherein the set of rules generated by the rule induction engine for a group is a non-hierarchical set of rules.

3. The method of claim 1, wherein each decision tree constructed is comprised of a root node, middle nodes, and leaf nodes.

4. The method of claim 1, wherein the rule induction engine generates decision trees by using a modeling approach selected from the group including a decision tree model approach, neural network model approach, or logistic regression model approach.

5. The method of claim 1, wherein the subsets of the descriptive data and target values are used to learn predictive relationships between the descriptive data and the target values.

6. The method of claim 5, wherein the descriptive data is indicative of a warranty class.

7. The method of claim 6, wherein target values are indicative of a product warranty class.

8. The method of claim 6, wherein the target values are codes that are indicative of a type of vehicle repair.

9. The method of claim 8, wherein the generated decision trees for each of the groups are used to predict codes based upon warranty-related descriptions.

10. The method of claim 1, wherein each group has a given maximum number of members.

11. The method of claim 1, wherein most of the groups have the same number of members.

12. The method of claim 1, wherein member size of the groups is determined based upon processing constraints of the rule induction engine.

13. The method of claim 1, wherein member size of the groups is determined based upon an industry standard.

14. The method of claim 1, wherein target values are partitioned using a rule indication node provided by a data mining software program.

15. The method of claim 1, wherein the target values are codes that are indicative of a type of vehicle repair, wherein the generated decision trees for each of the groups are used to predict codes based upon warranty-related descriptions, said method further comprising:
    reimbursing a dealer based upon the predicted codes.

16. The method of claim 15, wherein a database associates reimbursement information with a warranty code, said method further comprising:
    retrieving, from the database, reimbursement information based upon the predicted codes;
    using the retrieved reimbursement information to reimburse the dealer.

17. The method of claim 1, wherein the target values are codes that are indicative of a type of vehicle repair, wherein the generated decision trees for each of the groups are used to predict codes based upon warranty-related descriptions, said method further comprising:
    determining that a discrepancy exists between a warranty code provided by a dealer and a predicted code;
    allowing the dealer to explain the discrepancy.

18. A data signal that is transmitted using a network, wherein the data signal includes the generated decision trees of claim 1;
    wherein the data signal comprises packetized data that is transmitted across the network.

19. One or more computer readable storage mediums for storing computer software comprising program code for carrying out a method for constructing decision trees to predict target values, said method comprising the steps of:
    receiving data containing descriptive data and target values;
    partitioning the target values into groups;
    wherein each group contains a subset of the target values;
    applying a rule induction engine to generate a set of rules for each group based upon a subset of the descriptive data that is used for each group;
    wherein the rule induction engine generates decision trees by using a modeling approach that includes a decision tree model approach, a neural network model approach, or a logistic regression model approach;
    wherein the rules specify a relationship between the descriptive data and the target values in a group;
    wherein the rules are configured to predict target values;
    generating, in a bottom-up manner, a decision tree for each of the groups;
    wherein the generation in a bottom-up manner includes using the rule set of a group to generate leaf nodes of the decision tree for the group before generating the middle nodes and root node of the decision tree for the group;
    whereby the generated decision trees for each of the groups are used to output predicted target values for input data.

20. A computer-implemented system for constructing decision trees to predict target values, comprising:
    a data store stored on a computer-readable storage medium to store data containing descriptive data and target values;
    partitioning software instructions for execution on a processor to partition the target values into groups;
    wherein each group contains a subset of the target values;
    a rule induction engine for execution on the processor to generate a set of rules for each group based upon a subset of the descriptive data that is used for each group;
    wherein the rule induction engine generates decision trees by using a modeling approach that includes a decision tree model approach, a neural network model approach, or a logistic regression model approach;
    wherein the rules specify a relationship between the descriptive data and the target values in a group;
    wherein the rules are configured to predict target values;
    software instructions for execution on the processor to generate, in a bottom-up manner, a decision tree for each of the groups;
    wherein the generation in a bottom-up manner includes using the rule set of a group to generate leaf nodes of the decision tree for the group before generating the middle nodes and root node of the decision tree for the group;
    whereby the generated decision trees for each of the groups are used to output predicted target values for input data.

* * * * *